US007289966B2

(12) United States Patent
Ouchi

(10) Patent No.: US 7,289,966 B2
(45) Date of Patent: Oct. 30, 2007

(54) METHOD AND SYSTEM FOR ADAPTING THE EXECUTION OF A WORKFLOW ROUTE

(76) Inventor: Norman Ken Ouchi, 20248 ViewCrest Ct., San Jose, CA (US) 95120

( * ) Notice: Subject to any disclaimer, the term of this patent is extended or adjusted under 35 U.S.C. 154(b) by 990 days.

(21) Appl. No.: 09/929,412

(22) Filed: Aug. 14, 2001

(65) Prior Publication Data

US 2003/0036934 A1  Feb. 20, 2003

(51) Int. Cl.
*G06F 9/44* (2006.01)
(52) U.S. Cl. ......................................................... 705/7
(58) Field of Classification Search ...................... 705/7
See application file for complete search history.

(56) References Cited

U.S. PATENT DOCUMENTS

| | | | | |
|---|---|---|---|---|
| 5,452,294 A | * | 9/1995 | Natarajan | .................... 370/351 |
| 5,701,484 A | * | 12/1997 | Artsy | .......................... 719/316 |
| 5,706,452 A | * | 1/1998 | Ivanov | ........................ 715/751 |
| 5,734,837 A | * | 3/1998 | Flores et al. | .................... 705/7 |
| 5,737,727 A | * | 4/1998 | Lehmann et al. | ............... 705/7 |
| 5,744,661 A | * | 4/1998 | Luly et al. | ................... 570/177 |
| 5,745,687 A | * | 4/1998 | Randell | ....................... 709/201 |
| 5,826,239 A | * | 10/1998 | Du et al. | ......................... 705/8 |
| 5,848,271 A | * | 12/1998 | Caruso et al. | ............... 712/220 |
| 5,870,545 A | * | 2/1999 | Davis et al. | ................. 709/201 |
| 5,960,404 A | * | 9/1999 | Chaar et al. | .................... 705/8 |
| 5,999,911 A | * | 12/1999 | Berg et al. | ...................... 705/9 |
| 6,041,306 A | * | 3/2000 | Du et al. | ......................... 705/8 |
| 6,073,109 A | * | 6/2000 | Flores et al. | .................... 705/8 |
| 6,225,998 B1 | * | 5/2001 | Okita et al. | ................. 715/853 |
| 6,278,977 B1 | * | 8/2001 | Agrawal et al. | ................ 705/7 |
| 6,380,951 B1 | * | 4/2002 | Petchenkine et al. | ........ 715/736 |
| 6,430,538 B1 | * | 8/2002 | Bacon et al. | ................... 705/9 |
| 6,510,431 B1 | * | 1/2003 | Eichstaedt et al. | ............ 707/10 |
| 6,539,404 B1 | * | 3/2003 | Ouchi | ......................... 715/500 |
| 6,546,364 B1 | * | 4/2003 | Smirnov et al. | ................ 705/8 |
| 6,832,202 B1 | * | 12/2004 | Schuyler et al. | ............... 705/8 |
| 6,985,938 B2 | * | 1/2006 | Ohsaki et al. | .............. 709/223 |
| 2001/0044738 A1 | * | 11/2001 | Elkin et al. | ..................... 705/8 |
| 2002/0046072 A1 | * | 4/2002 | Arai et al. | ...................... 705/8 |

(Continued)

OTHER PUBLICATIONS

Workflow Management Coalition—The Workflow Reference Model Workflow Management Coalition, Jan. 19, 1995.*

(Continued)

*Primary Examiner*—Tariq R. Hafiz
*Assistant Examiner*—Scott L. Jarrett

(57) ABSTRACT

A business process is defined as a sequence of process steps where each process step is performed by an assigned user. A workflow route to support the business process provides a sequence of steps where each step corresponds to a business process step and has an associated user to execute the step. The user can be a set of users or an automated program. A workflow system can implement the business process by executing the corresponding route. A route is defined before the route is executed. However, the routes for some business processes cannot be completely defined before start of execution because of organizational boundaries, complexity of business process, number of choices, etc. The execution of a route can be adapted to a business process through use of a step in the route where the user associated with the step can specify subsequent steps and associated users for execution in the route.

20 Claims, 11 Drawing Sheets

U.S. PATENT DOCUMENTS

2002/0055849 A1* 5/2002 Georgakopoulos et al. .... 705/1
2002/0161823 A1* 10/2002 Casati et al. ................ 709/202
2004/0078373 A1* 4/2004 Ghoneimy et al. ........... 707/10

OTHER PUBLICATIONS

Ellis, Clarence et al., Dynamic Change Within Workflow Systems COOCS 1995, ACM, pp. 10-21.*

Karen, Mitchell, Juggling deeds, deadlines InforWorld, Jan. 27, 1997, vol. 19, No. 4, pp. 96-97.*

Dunn, Julie, Workflow solutions: Going with the flow InfoWorld, Jan. 6, 1997, vol. 19, No. 1, pp. 52-58.*

Ader, Martin, Seven workflow engines reviewed Document World, May/Jun. 1997, vol. 2, No. 3, pp. 19-26.*

Cox, Nancy, Passing the baton with four enterprise-ready workflow management products Network Computing, Oct. 15, 1997, vol. 8, No. 19, pp. 130-136.*

Meijler, Theo Dirk et al., Realising Run-time Adaptable Workflow by means of Reflection in the Baan Workflow Engine CSCW, 1998.*

Vossen, Gottfired et al., Flexible Workflow with WASA2 Sigmod 1999.*

Neinl, Petra et al., A Comprehensive Approach to Flexibility in Workflow Management Systems ACM, 1999, pp. 79-88.*

Georgakopoulos, Dimitrios et al., Managing Escalation of Collaboration Processes in Crisis Mitigation Situations Proceedings of ICDE 2000.*

Casati, Fabio et al., eFlow: A Platform for Developing and Managing Composite eServices HPL-2000-36, Mar. 2000.*

Casati, Fabio et al., Adaptive and Dynamic Service Composition eFlow HPL-2000-39, Mar. 2000.*

BizTalk Orchestration Microsoft, Jun. 5, 2000.*

Shegda, Karen Opent Text Corp. Livelink Gartner Group, Inc., Dec. 4, 2000.*

Halliday, J.J., Flexible Workflow Management in the OPENflow system Fifth IEEE Confereence On Distributed Object Computing, 2001.*

Han, Yanbo et al. A Taxonomy of Adative Workflow Management 1998 ACM Conference on Computer Supported Cooperative Work, 1998.*

Georgakopoulos, D. et al., An Overview of Workflow Management: From Process Modeling to Workflow Automation Intrastructure, Distributed and Parallel Databases, vol. 3, 1995, pp. 119-153.*

Voorhoeve M. et al., Ad-hoc Workflow: Problem and Solutions IEEE, 1997, pp. 36-40.*

Ott, Marcus, Conceptual Design and Implementation of a Graphical Workflow Modeling Editor in the Context of Distributed Groupware Databases, University of Paderborn, Master Thesis, May 1994.*

ActionWorkflow Enterprise Series 3.0 Process Builder User's Guide Action Technologies, Inc., 1996.*

Using the WFT Development Environment Template Software, 1998.*

Teamware Flow 3.1 User's Guide, Third Edition TeamWare Group, Apr. 2000.*

Koulopoulos, Thomas, M., The Workflow Imperative John Wiley & Sons, 1995, ISBN: 0-471-28685-0.*

Carlsen, Steinar, Conceptual modeling and composition of flexible workflow models Norges teknisk-naturvitenskapelige universitet (Norway), 1998, 306 pages; AAT C646470.*

* cited by examiner

METHOD AND SYSTEM FOR ADAPTING THE EXECUTION OF A WORKFLOW ROUTE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

TECHNICAL FIELD

This invention is related to a workflow system, and more particularly to a workflow system with a route where the route controls the sequence of workflow nodes to execute a business process.

BRIEF SUMMARY OF THE INVENTION

In the present invention, a sub-route selection screen is provided by a node in a route of a workflow system running on a server connected to a network. The sub-route selection screen permits a user to select a sub-route as a subsequent portion of the route to adapt the route used by the workflow system to support a business process.

BACKGROUND OF THE INVENTION

A business process is a sequence of steps executed by a set of users where each step is assigned to a specific user. In FIG. 1, the business process 1 consists of Step A, Step B, Step C and Step D. To execute the business process 1, a person is assigned to execute Step A, another person is assigned to Step B, etc. The business process 1 may have a written procedure but it does not have a mechanism to assure that the steps are executed in the prescribed sequence. A workflow system can use a route, a sequence of workflow nodes, to control and track a business process by mapping the sequence of business process steps to a corresponding sequence of nodes in the workflow route and assigning to each node the user responsible for execution of the business process step. In FIG. 1, the workflow route 2 consists of Node A corresponding to business process 1 Step A, Node B corresponding to Step B, etc. Each node 3 is assigned a user 5 and provides a user screen 4 or set of screens to accomplish the business process step. The workflow route begins execution when "Start" initiates and passes "control" to the first node in the route. When control is passed to a node, the node 3 activates the screen 4 for the assigned user 5. The assigned user 5 uses the screen 4 to accomplish the business process step. When the user 5 has completed the process provided by the screen 4, control is passed to the next node in the route. Control is passed in the sequence of nodes designated by the route until a node passes control to "Complete" which terminates the execution of the workflow route. To be effective in controlling and tracking a specific business process, the workflow route must match the flow of the business process and assign the appropriate people as users for each node. Creating the route requires an understanding of the business process and the people who execute each of the process steps. FIG. 2 illustrates the route creation or route generation process. Each node 3 must be defined to execute the appropriate business process step, the nodes must be placed in the proper sequence to accomplish the business process, and the users must be selected for each node. The users may be selected from a list of candidates 6 for each node. The sphere of knowledge 7 or domain of the specific business process and the potential users illustrates what needs to be understood to generate the route. Route creation can take significant effort. Workflow systems have been very successful when applied to business processes that are well defined and do not have high variability.

Workflow technology supports conditional branching and parallel processing functions to support most business processes. The route can contain nodes that permit conditional branching to support business processes that require decision to be made and different sub-processes executed based on the decision. For example, a travel expense payment business process may require that the manager of the travel expense originator approve a travel expense. If approved, the travel expense is paid and if not approved, the travel expense is sent back to the originator. The workflow route can be divided into segments called sub-routes. A sub-route to support the manager approval portion of the travel expense business process would provide a node with a screen for the manager to view the travel expense and to respond either "APPROVE" or "NOT APPROVE" using labeled buttons on the screen. Based on the response, the workflow route would branch to the appropriate sub-route: if "APPROVE", then a sub-route that sends the travel expense to accounts payable is activated; if "NOT APPROVE", then a sub-route that sends the travel expense to the originator is activated. The route can contain a node that activates two or more sub-routes in parallel. In the travel expense example, the "APPROVE" sub-route could be augmented to send the travel expense to accounts payable and in parallel send a copy to the originator (so she or he can know that the expense has been approved). This is called a "fork" using parallel processing terminology. There is a complementary node called a "join" where parallel sub-routes converge to become a single sub-route.

In general, the route is generated before the route is used by the workflow system. That is, the specific sequence of nodes and users are assigned before the business process begins execution. However, the information in the business process may determine that an alternative sub-process with corresponding workflow sub-route should be used or that another user should be processing a particular business process step with corresponding workflow node. If the number of choices and the number of choice points are low, it may be possible to construct a route structure with conditional branches to cover all possibilities. This will cover many simple business processes. But many business processes in large organizations cannot be covered with a route that is constructed a priori.

For example, a contract manufacturing company, called a CM, manufactures computers system for a global computer design and marketing company, called an Original Equipment Manufacturer or OEM. Examples of CM's are Solectron, Flextronics, and Sanmina. Examples of OEM's are IBM, Cisco, and Sun. The OEM requests a quotation from the CM to build a specific computer system and sends the CM a quotation package that has the description of the computer system and expected volume of units to be manufactured. The CM is to build the product in four regions: Europe, Asia, North America, and South America. Within each region are manufacturing plants that specialize in building the electronics, the frame, the power supplies, assemble and test the completed units, etc. The interface between the CM and the OEM is a global account manager who is responsible for getting the quotation completed and back to the OEM. The global account manager has a general understanding of the capabilities of each region and the key manufacturing plants in each region but does not know the specific people to whom the quotation package should be sent. The global account manager does know the region account managers in each region who in turn know the key people in each manufacturing plant who in turn know the specific individuals who should work on their portion of the quotation. But the global account manager makes the assignment of the quotation package based on the type of computer system to be built and the volumes that are assigned to each region. The region account manager will assign portions of the package to specific manufacturing plants based on the manufacturing processes and capacity at each plant. Within each plant are the key people who know the individuals who should work on the quotation. Each plant may have a set of different manufacturing processes and thus a set different quotation processes corresponding to the local plant capabilities. A workflow route for this quotation example would be very difficult to create a priori since much of the route needs to be determined by both the contents of the quotation package and the capabilities and capacities of each plant. Maintaining the route is also a formidable task since all of these elements plus the individuals at each plant are always changing.

The prior art provides means for defining sub-routes, defined segments, which may be managed independently and joined to form a larger route structure. However, the prior art does not suggest how these may solve the issues of adapting the route to the business process requirements in the cited example.

The prior art also provides means for changing the flow of the process in an ad hoc manner by permitting the control to flow "off the route" to users out of the sequence as defined by the route or even to users who are not on the route. These means do not provide control of the business process. What is desired is that the flow of control be itself be constrained to a set of predefined sub-routes in response to the needs of a business process during the execution of the route. The selection of the sub-routes and the creation of the resulting composite route is done at run-time in response to the business process and the information used in the business process.

Route generation requires that the person creating the route have knowledge of the specific business process steps and the population of users that may be assigned to each step. Route generation by one person (or a small group) is effective for small organizations where a person can know both the business process steps and the individual user who should be assigned to a step. However, the route generation in a large organization can be difficult since no single person has the knowledge to determine the assignment of users to business process steps. The user assignment problem may be compounded by the need to assign users based on the information being processed by the business process. That is, the users in the route cannot be established as a static route but must be altered based on the actual information processed. For example, the business process may be for processing customer requests but it may be difficult to determine a priori the users required for each specific customer request. FIG. 3 illustrates three similar but different routes where there is a route 10 for Customer request type 1, route 11 for Customer request type 2, and route 12 for Customer request type 3. Each customer request type has a different business process and the users assigned in each process depend on the information in the customer request. The appropriate user for each process step and node is selected from a list of candidates 6 associated with each node. In a small organization, a person could select the appropriate route and users to respond to the customer request before starting the business process. However in a larger organization, this may be difficult to do since no one person can know who should respond to a specific customer request. In addition to selecting the appropriate user, it may be the case where each sub-organization in a large organization has a different sub-business process to respond to a customer request so not only is the user assignment based on customer request, the sub-process may be different based on the sub-organization selected to respond. In addition, the users in a large organization change, user assignments change, and business sub-process change. Maintaining routes and administering the user population on a complete organization basis for a large organization can be difficult if not impossible. Plus, many organizations are now virtual in that the sub-organizations may belong to separate companies but customers expect the requests to have responses as though they were from a single organization. Underlying the route generation issues are still the requirements that the workflow control and track the business process and that the route adapt to the specifics of the business process, which may depend on the information used in the process. In effect, custom routes need to be generated for each use. Route generation under these conditions cannot be an off-line, a priori process but now part of the business process execution and must be executed in a controlled and timely manner as part of the total response to the customer.

What is desired is a means to create a route during the execution of a business process to support the business process in an organization where the sub-organization business processes and assignment of users are dependent on the business data for that particular use of the route. In addition, the definitions of the sub-processes are controlled by the sub-organizations and thus, the definition of the sub-routes and the assignments of users must also be controlled by the sub-organizations.

DESCRIPTION OF THE INVENTION

Figure 1:
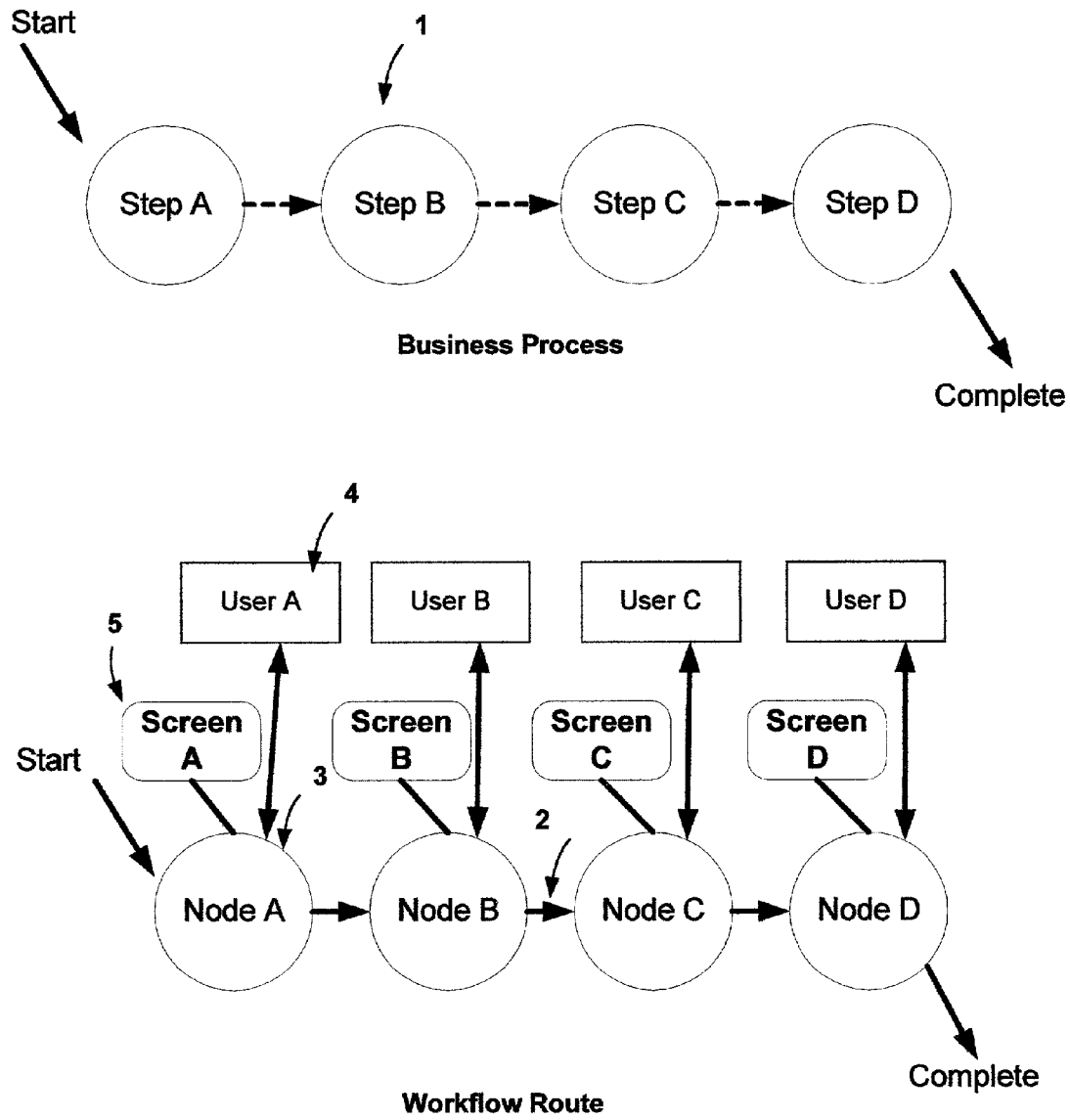
FIG. 1 illustrates a business process and a workflow route to support the business process.
Figure 2:
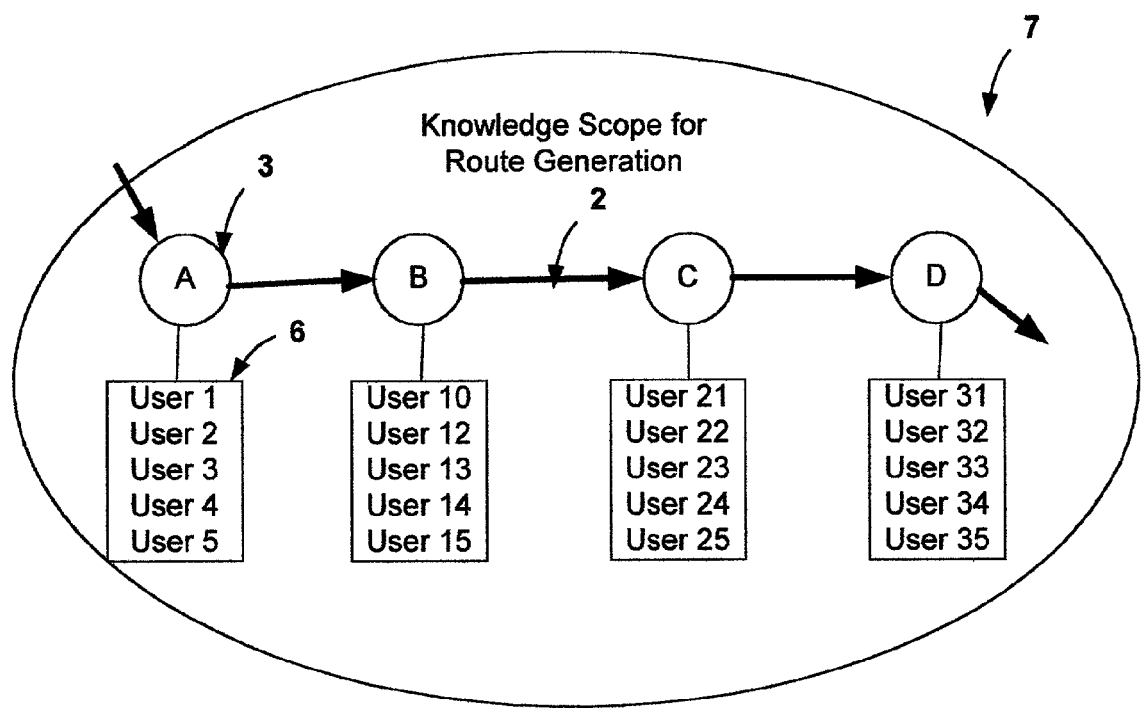
FIG. 2 illustrates a workflow route and the sphere of knowledge needed to generate the route.
Figure 3:
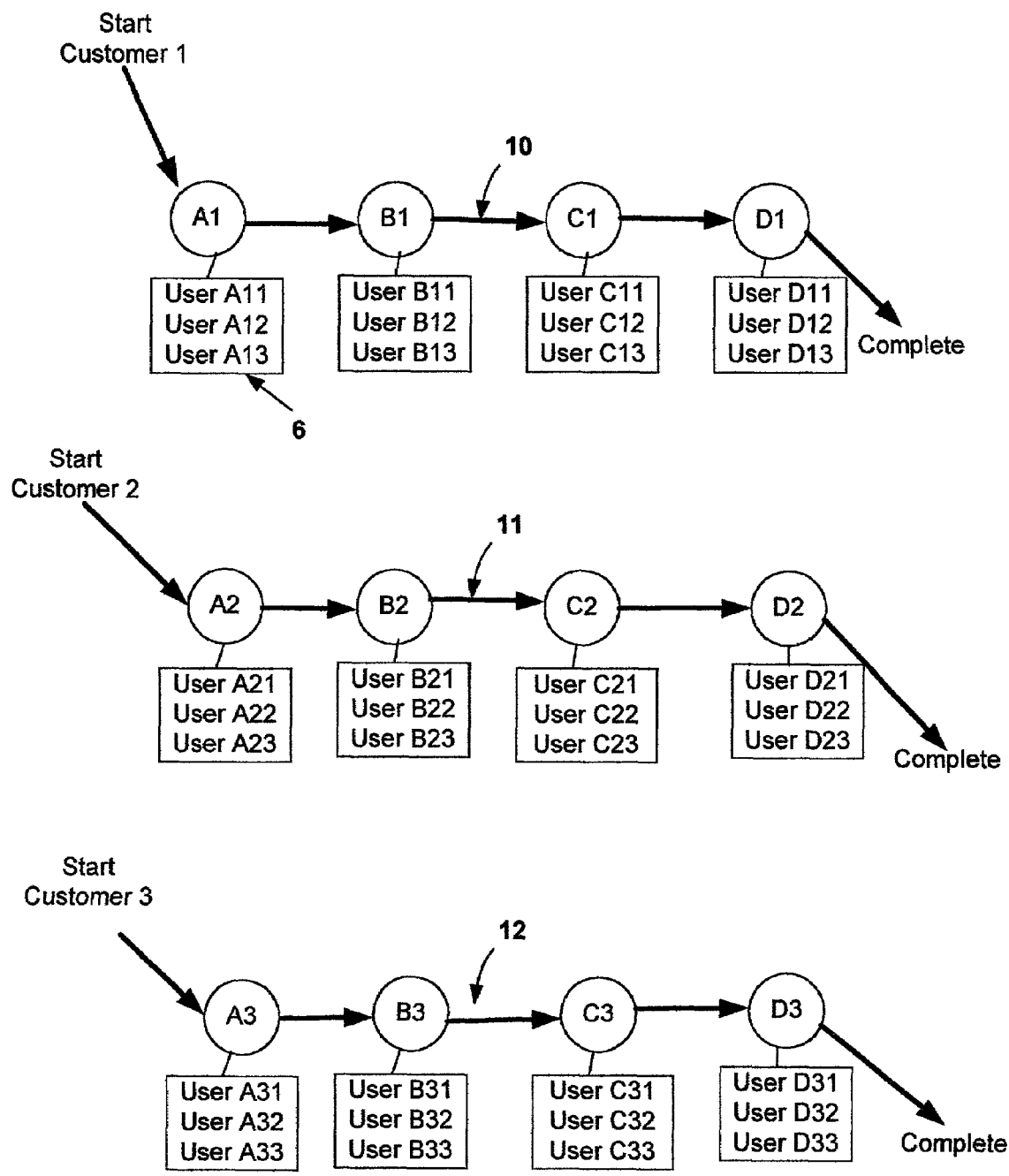
FIG. 3 illustrates separate workflow routes to support three customers.
Figure 4:
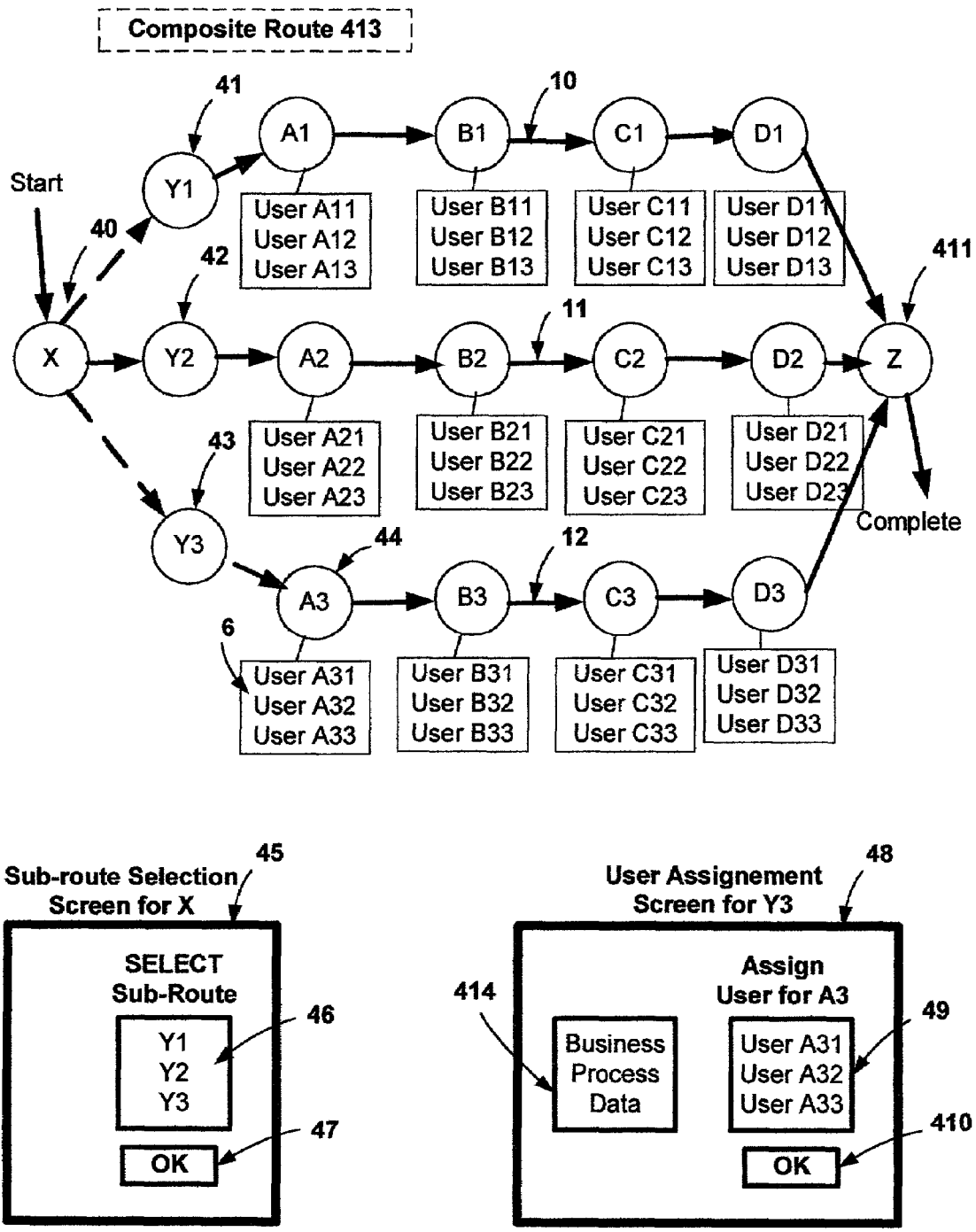
FIG. 4 illustrates a selection node in the workflow to select a specific customer workflow route and selection nodes for users in the selected route.

In most large organizations, no one knows everyone. However, it is possible to assign someone, called a "key user", (actually several people so there is 24×365 coverage) in each sub-organization to know the users in their sub-organization who would be assigned to respond to specific aspects of a customer request if sent to their sub-organization. This person (or another set of local key users) can also administer the sub-route corresponding to the sub-process for that sub-organization. The problem of user and route administration can be localized and managed as it was done for a small organization for each sub-organization. FIG. 4 illustrates a composite workflow route 413 for customer request type 1 route 10, customer request type 2 route 11, and customer request type 3 route 12 where each original route is now a sub-route of the composite route 413. Y1 is the key user for customer request type 1 route 10, Y2 the key user for customer request type 2 route 11, and Y3 the key user for customer request type 3 route 12. Each workflow sub-route provides an initial node assigned to the sub-organization key user: node Y1 41 for key user Y1, node Y2 42 for key user Y2, and node Y3 43 for key user Y3. The initial node for sub-route 12 provides a key user screen 48 for the Y3 key user to view the business process data 414 and then select the appropriate user for node A3 44 from the list of potential users 6 using a select box 49 and OK button 410 to support the business process. In addition (but not illustrated), the key user screen 48 provides Y3 the ability to assign users to the other nodes in the sub-route 12. When node Y3 43 is selected, key user Y3 competes the assignment of users and the sub-route 12 continues execution of the workflow starting with node A3 44. In a similar manner, node Y1 41 permits key user Y1 to assign the users to each node of the sub-route 10 before execution and node Y2 42 permits key user Y2 to assign the users to each node of the sub-route 11 before execution. The three sub-routes join at node Z 411 to complete the composite route 413. Note that each sub-route could have completed at the last node of the sub-route in this example but node Z 411 is to illustrate that each sub-route can be configured to continue the composite route and thus not terminate a business process. One can think of a sub-route like a sub-routine in programming where the sub-routine can be called by a main routine and return control to the main routine when complete.

The key users have detailed knowledge of their respective sub-organization but not detailed knowledge of other sub-organizations. A super key user can have general knowledge of each sub-organization and be capable of selecting the sub-organization to respond to a particular request from a customer. To select the sub-organization, the composite route 413 provides node X 40 with a screen 45 for super key user X who can select the key user from the list of key users: Y1, Y2, or Y3 using the select box 46 and OK button 47. The organization structure is now a two level hierarchy where the top level, the super key user, need only know the key user for each sub-organization (and not each user) and each key user need only know the users in their sub-organization. However, the composite 413 route for a business process is different in that it can be built "on the fly" based on the customer request. The route has a start node X 40 assigned to the super key user X. The node X 40 provides a screen 45 that permits the super key user X to select a sub-route and key user in a sub-organization to respond to the customer request: Y1 41, Y2 42, or Y3 43. Once selected, the workflow system begins execution of the selected sub-route. In the example in FIG. 4, node Y3 43 was selected which provides a screen 48 for key user Y3 to select the users in their sub-organization to be assigned to the subsequent nodes of sub-route 12 to respond to the customer request. Note that the sub-route selection screen 45 can be used in a single level hierarchy and does not require the user assignment screen 48 if the users of a sub-route are selected a priori. The user assignment screen 48 may be used independent of the sub-route selection function where the route is pre-selected but all users in the route not assigned.

Figure 5:
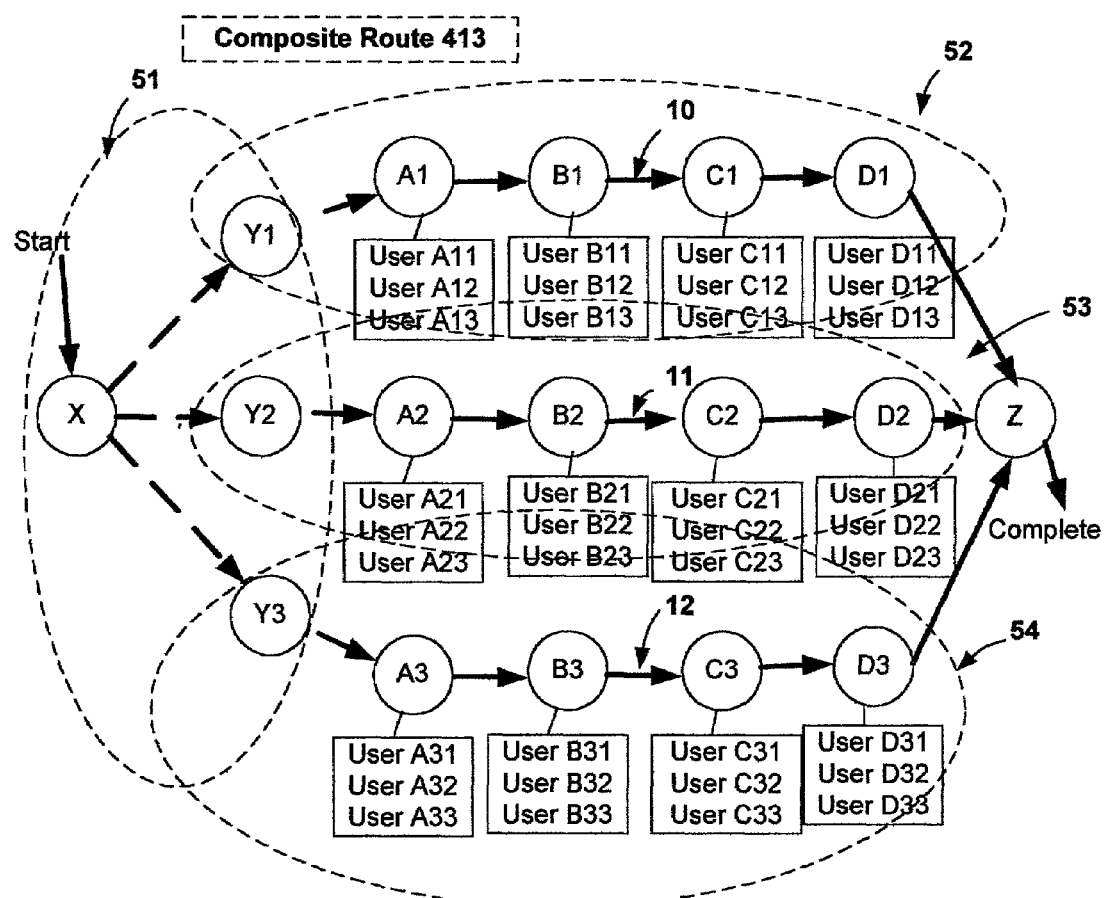
FIG. 5 illustrates the spheres of knowledge required to generate the workflow illustrated in FIG. 4.

The key aspect of this invention is that the route is adapted to the business process during the execution of the business process and route generation is part of the route and controlled and tracked as part of the business process. The knowledge of the organization is distributed as illustrated in FIG. 5 where super key user X need only have the sphere of knowledge 51 of key users Y1, Y2, and Y3. Key user Y1 need only have the sphere of knowledge 52 of the sub-route 10, consisting of nodes A1, B1, C1, D1 and the users who can be assigned to each node. Similarly, key user Y2 need only have the sphere of knowledge 53 of the sub-route 11 and assignable users; and key user Y3 need only have the sphere of knowledge 54 of the sub-route 12 and assignable users.

Figure 6:
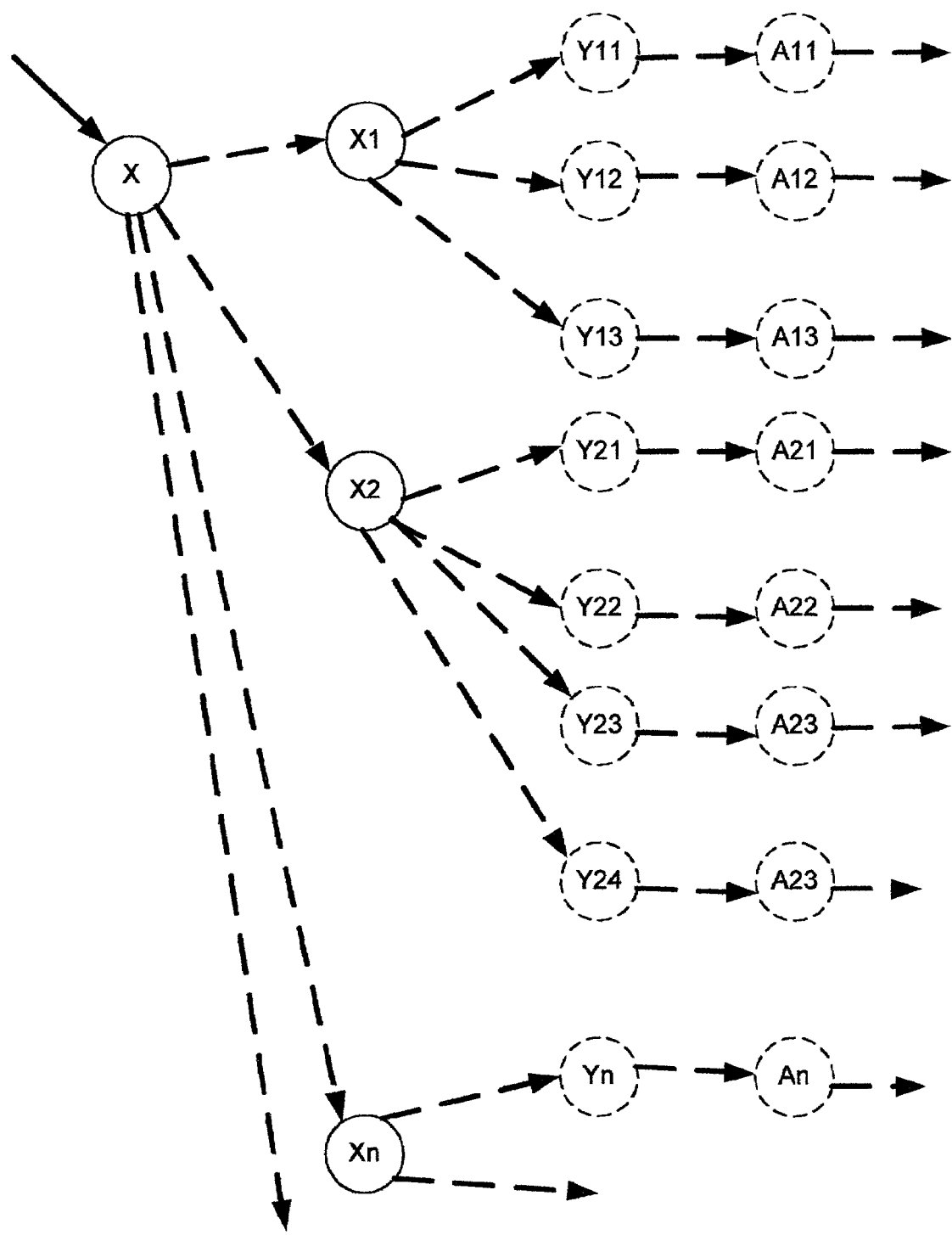
FIG. 6 illustrates a complex workflow route with cascaded sub-route selection nodes.

The sub-route selection function and the user assignment function may be used at other nodes in the route and not just in the beginning of the route. For example a business process requires that the two levels of organization be determined before the sub-process can be identified and executed. In FIG. 6 node X selects from sub-routes X1, X2, . . . Xn. Each sub-route can select from sub-routes within their sub-organization. Thus, X1 can select from Y11, Y12, and Y13; X2 can select from Y 21, Y22, Y23, and Y24; Xn can select from Yn, etc. In the example of the global CM and global OEM, the OEM requests a quotation form the CM. The CM global account manager would know the key person at each region, the region account manager, but would not know the business process or users at each site. The global account manager would be X and would select the region account managers X1, X2, . . . Xn at each site: The region account manager X1 would then view the OEM quotation package and select one of the sub-routes Y11, Y12, or Y13 corresponding to a manufacturing plant in the region to respond to the OEM quotation. Since region account manager X1 may not know the individual users, the first screen of each sub-route is a user assignment function where Y11 is assigned to a key user at the specified manufacturing plant who determines the specific users for execution of that sub-route. The route and the users associated with each route node is generated during the execution of the workflow route, "on the fly", by timely selection from a pre-defined set of sub-routes using a selection screen node in the route and a set of users associated with the nodes in the selected sub-route using a user selection screen.

The assignment of users can be made using the concept of a "role" where a route node is assigned a specific role. Users are then assigned to roles. This permits the route definition to be static where the variable "role" acts as the user but still permit users to change assignments or roles. But the role concept does not provide the dynamic "on the fly" capabilities cited above nor does it make the route generation part of the route. The user assignment screen 48 may be adapted to assign a role rather than a user. An additional screen is used to assign users to roles.

The sub-route selection function may be adapted to select a sub-route based on an external condition using a conditional branch. The "APPROVE" or "NOT APPROVE" buttons on a screen for the travel expense business process is an example of selecting a sub-route based on a condition. The sub-route selection screen is adapted so the user can assign a selected sub-route to a button on the approval screen. When the approval screen user pushes the button, the selected sub-route is activated.

The sub-route selection function may be adapted to select a second sub-route to execute in parallel with the first selected sub-route. This will permit the initiation of parallel business sub-processes. The sub-routes may contain sub-route selection and user assignment functions in the nodes of the sub-route. The sub-route join function may be adapted to permit simple "and" and "or" joins where the "and" join requires all joining sub-routes pass control to the join node before proceeding and the "or" join requires only one sub-route to pass control before proceeding. The join node may be adapted to provide more complex join functions such as "majority" where the join node will proceed when a majority of the joining sub-processes pass control or a "weighted" where each sub-route is given a weight and the join node proceeds when the sum of the weights exceed a specified value. The weight assigned to a sub-route may be negative.

The sub-route selection function may be adapted to select the same sub-route twice so that the same business process is executed by two different sets of users. One initiation of the sub-route can assign one set of users and the second initiation can assign a second set of users.

The sub-route selection may be saved in a route selection library so that the combination of sub-routes may be easily recalled and potentially used again. A sub-section of a composite route may be saved as a sub-route in a sub-route library so the combination of sub-routes may be easily recalled and potentially used again. The users assigned to the nodes may be saved with the sub-routes for reuse or may be partially or fully discarded and new user assigned when re-used.

The sub-route may be created and then selected to provide rapid response to a new business process requirement or a sub-route may be modified and selected to respond to a change in a business process. The modified sub-route may be saved in a library for future use.

The selection of a sub-route may be based on conditions that may be determined by a program or other automation and a human screen may not be needed. In this case the node can be designed to run the program and select the sub-route.

Key users can create or modify sub-routes in their sphere of knowledge or domain. FIG. 5 illustrates four domains: 51, 52, 53, and 54. For example, a domain 52 may be a site in a multi-site organization. The key users in domain 52 administer the users associated with the business processes supported by sub-route 10 and other business processes and sub-routes for that site. To extend the example, domains 53 and 54 can also be sites and domain 51 can be a global organization. The key users for domain 53 administer the users and the sub-routes for their domain as does the key users for domain 54 for their users and sub-routes. The super key users of domain 51 administer the higher level global users and the routes that call or link to the sub-routes of the sites or lower domains.

DESCRIPTION OF A PREFERRED EMBODIMENT

Figure 7:
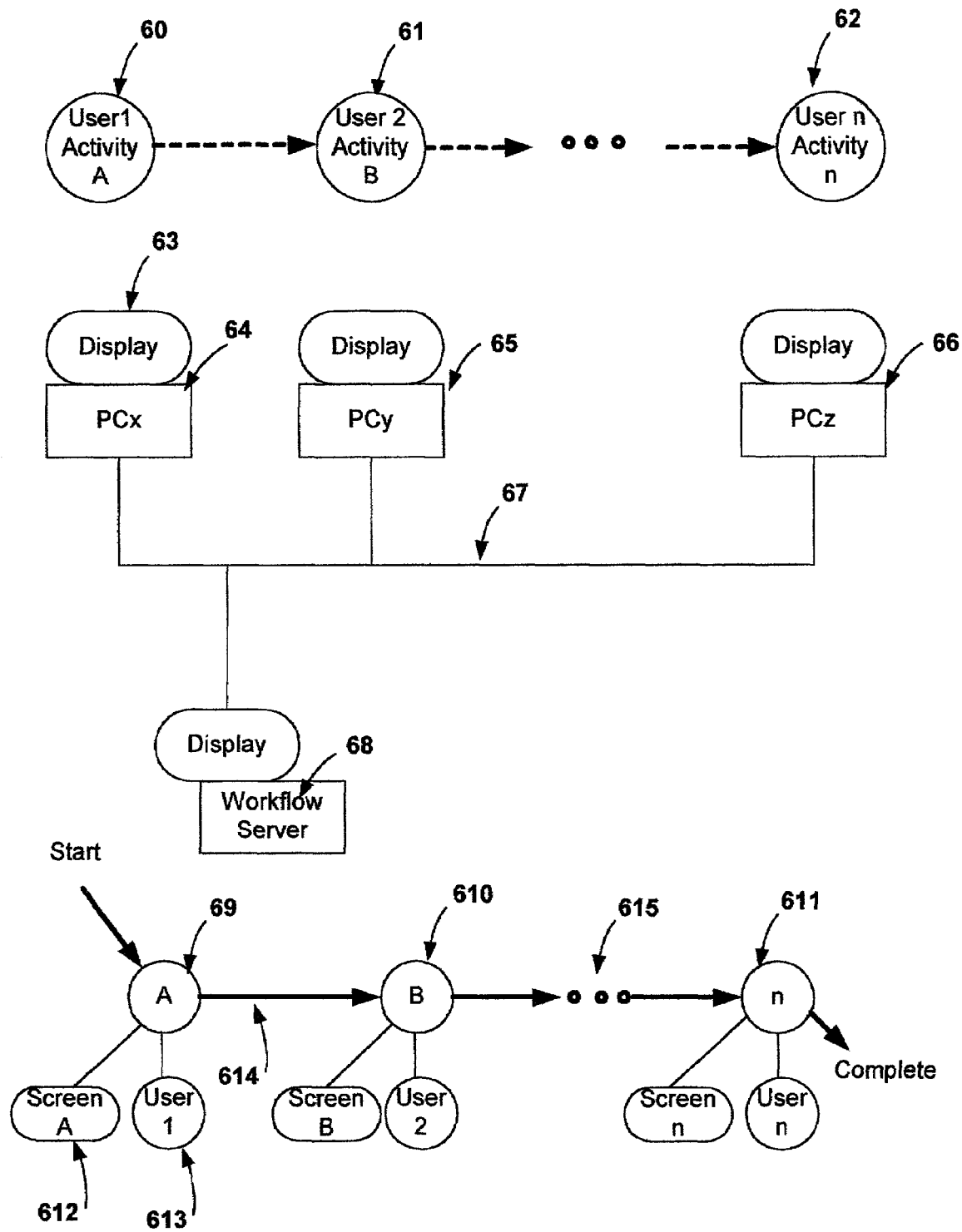
FIG. 7 illustrates a typical workflow system, users and route

A workflow system, illustrated in FIG. 7, is a computer program that executes usually on a server 68 that can be, for example, a PC from Dell or Compaq, a workstation or network server from SUN or Hewlett Packard, or a mainframe computer from IBM. The server can provide operating system services using for example, Microsoft Windows NT, Windows 2000, Sun Solaris, Hewlett Packard HP/UX, IBM O/S 9000. The workflow function can be provided by Bea Web Logic Process Integrator, Extricity Workflow, IBM Lotus Notes, Oracle Workflow or other workflow system providers. The workflow clients 64, 65, 66 usually execute on a PC, workstation, mainframe terminal, or other computer. However, Personal Digital Assistants, cell phones, two-way pagers, and other devices are now becoming workflow clients. The workflow system may require a workflow client program to execute on the workflow client system but most modern workflow systems only require an Internet Web browser compatible interface or an e-mail compatible interface. Each workflow client 64 has a display 63 and input device such as a keyboard or other means to provide the business process information and means to input the response from the user. The workflow clients are connected to the workflow server using a computer network such as a local area network, a wide area network, the Internet, a virtual private network, wireless networks, etc. Each workflow client has an address on the network by which the workflow server and the client can communicate. In FIG. 7, the workflow client 64 has address PCx, workflow client 65 has address PCy, and workflow client 66 has address PCz. Most contemporary workflow systems do not "hard wire" workflow address to a specific user but each user has an "account" or user address that is connected to a specific workflow client address only for a session or transaction. This permits a user to use any compatible physical workflow client and not be tied to a specific piece of hardware. A parallel example is the use of a web based e-mail account where the e-mail user can "log-on" to the user's e-mail account from any web compatible system and transact e-mail functions.

Most contemporary workflow systems do not have a "hard wired" business process flow but have data structure called a "route". A route is a collection of "nodes" where each node 69 specifies an activity, usually a screen 612 or set of screens, a user 613 to act on the screen to accomplish the activity, and a directed link 614 to a subsequent node. A node is activated when "control" is passed to the node through a directed link from a predecessor node. When activated, the node displays the screen to the associated user to accomplish the activity. When the activity is completed, control is passed to the next node using the directed link. The route has a "Start" to begin the execution and usually a "Complete" but it is possible to have a route that loops forever. The route is a directed graph or state machine description that is executed by the workflow system. The route is like a specialized programming language for the workflow system. As such, the basic programming functions such as conditional branching, iteration (looping), parallel processing, etc. may be embodied in routes for high function workflow systems. The business process illustrated in FIG. 7 begins with User 1 60 performing activity A, User 2 61 performing activity B, ... User n 62 performing activity n. The arrows are dotted since the business process is not controlled by a system and there is no mechanism to assure that the business process will execute as illustrated. The route 615 is generated to execute each step of the business process by mapping each business process step to a corresponding node in the route 615. Node 69 maps to business process activity 60, node 610 maps to business process activity 61, and node 611 maps to business process activity 62. When route 615 begins execution by "Start" passing control to node 69, node 69 provides the screen 612 to User 1 60 to perform activity A. When User 1 60 completes Activity A using screen 612, control is passed to node 610 using directed link 614. The workflow system accomplishes the sequence of activities of the business process by executing the route 615. With the workflow come the advantages of process control since the sequence of activities are controlled by the route, of traceability since the state of the process can be determined from the state of the route and the sequence or history of each activity can be stored by the workflow for analysis.

The key to the application of workflow to business processes is the creation of routes that support each business process. However, as cited earlier, the exact process flow and users may not be determined a priori but must be done after the business process information is provided, that is, after the business has started. In some cases, the results of an intermediate process step may require that the flow of the business process be altered. Nodes with conditional branching function may solve many of these issues but a broader solution is needed. As stated earlier, a workflow route is like a program. Most programs are not written as a single body or code line but use structures such as subroutines that may be used by the program without the need to write the functions of the subroutine. Most contemporary operating systems provide the ability for a program to use, call or link, to subroutines at runtime. This provides significant advantages in that the subroutine need not be developed a priori but can be created and used "just in time" to meet the objectives of the mainline program. The runtime linkage capability also provides efficiencies for complex programs in that all of the linkage need not be resolved at generation time but deferred to runtime where many of the links may never be used thus avoiding work for subroutines that will not be used. The real time generation of routes is not as demanding as the runtime linkage of programs. The equivalent to the runtime linkage process are the functions of selecting sub-routes and assigning users to nodes. Creation of a sub-route for "just in time" execution will also be required. The business processes execute in terms of human speed: minutes, hours, and days. Sub-route selection and user assignment functions that take several minutes or even sub-route generation that takes an hour is acceptable. Unlike program development, which is done by programming specialist, the users who understand the local business processes and user capabilities can do the sub-route selection and user assignment. The local sub-organization users also can create the sub-routes to match their local business processes and create the user candidate lists for each sub-route node.

Figure 8:
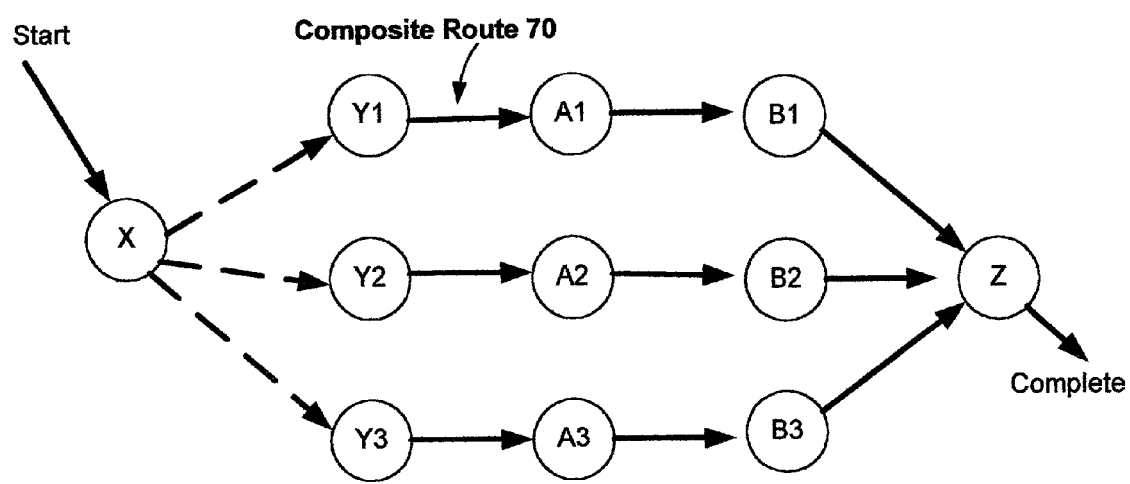
FIG. 8 illustrates a composite route with the structure for sub-route selection.
Figure 9:
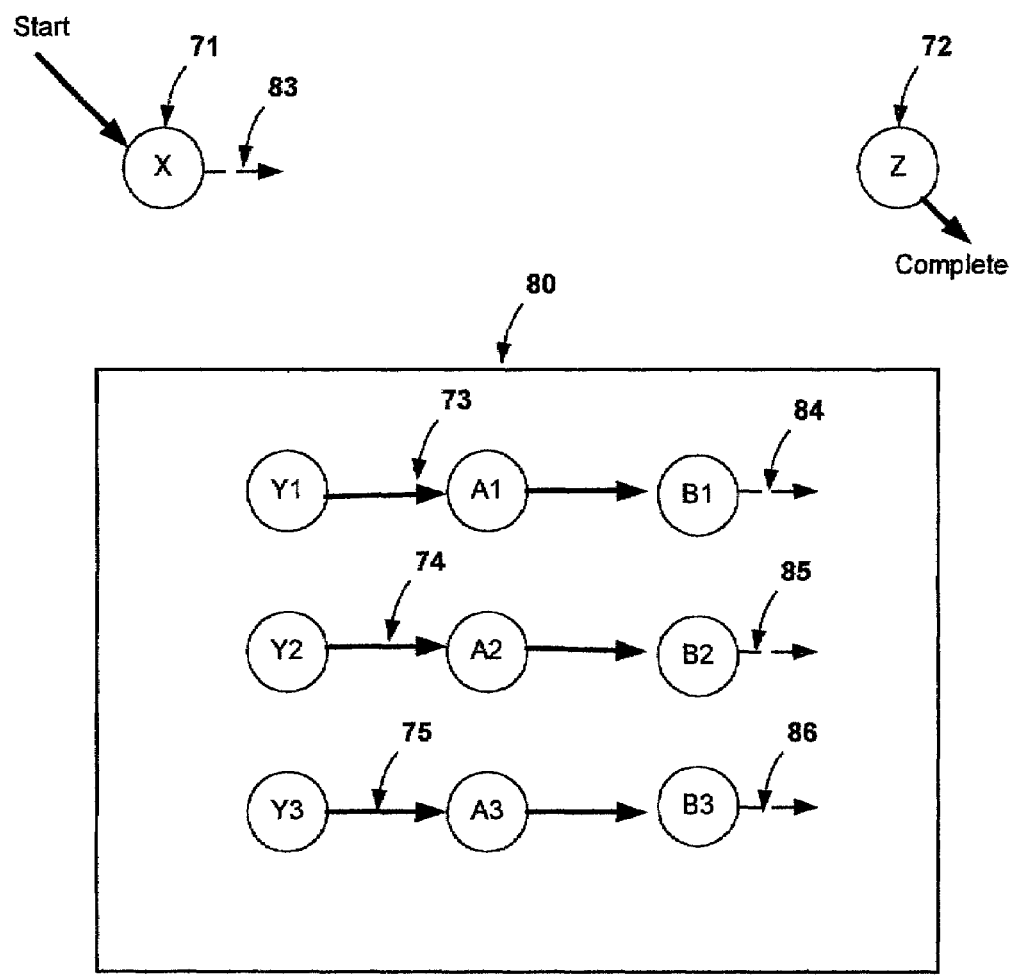
FIG. 9 illustrates the composite route generation using links to sub-routes in a library.
Figure 9:
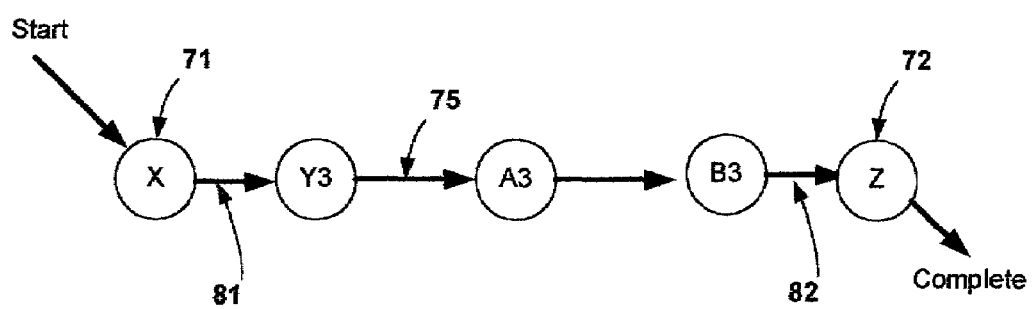

FIG. 8 illustrates a Composite Route 70 that has the potential of executing one of three sub-routes starting with Y1 or Y2 or Y3. FIG. 9 illustrates the elements to create the effect of Composite Route 70 using a runtime linkage process. The core route consists of node 71 to start the route and select the sub-route and node 72 to complete the route. Node 71 is assigned to User X, has a screen to view the business process information and to select a sub-route, and has a link 82 that is not connected. The sub-route library 80 contains sub-route 73 that starts with node Y1 and ends with disconnected link 84, sub-route 74 that starts with Y2 and ends with disconnected link 85, and sub-route 75 that starts with node Y3 and ends with disconnected link 86. The business process starts and node 71 is given control. Node 71 displays the business process information to User X and User X selects from the library 80 the appropriate sub-route to process the business information. In the example illustrated in FIG. 9, User X selects sub-route 75. The composite route linkage process copies the sub-route 75, connects link 82 to the first node Y3 in the copy of sub-route 75 and connects the copy of link 86 to node 72. Those skilled in the art of subroutine linkage systems and libraries understand that if the sub-routes are designed to be re-entrant and the linkages and user assignments kept in a separate structure that the sub-routes need not be copied. The effect of copying the sub-route permits it to be used in a composite route while in use in another composite route. The composite route linkage process can create the composite route in real time using the sub-route selection screen or may be used in an off-line process with a modified sub-route selection screen to crate the composite route a priori.

Figure 10:
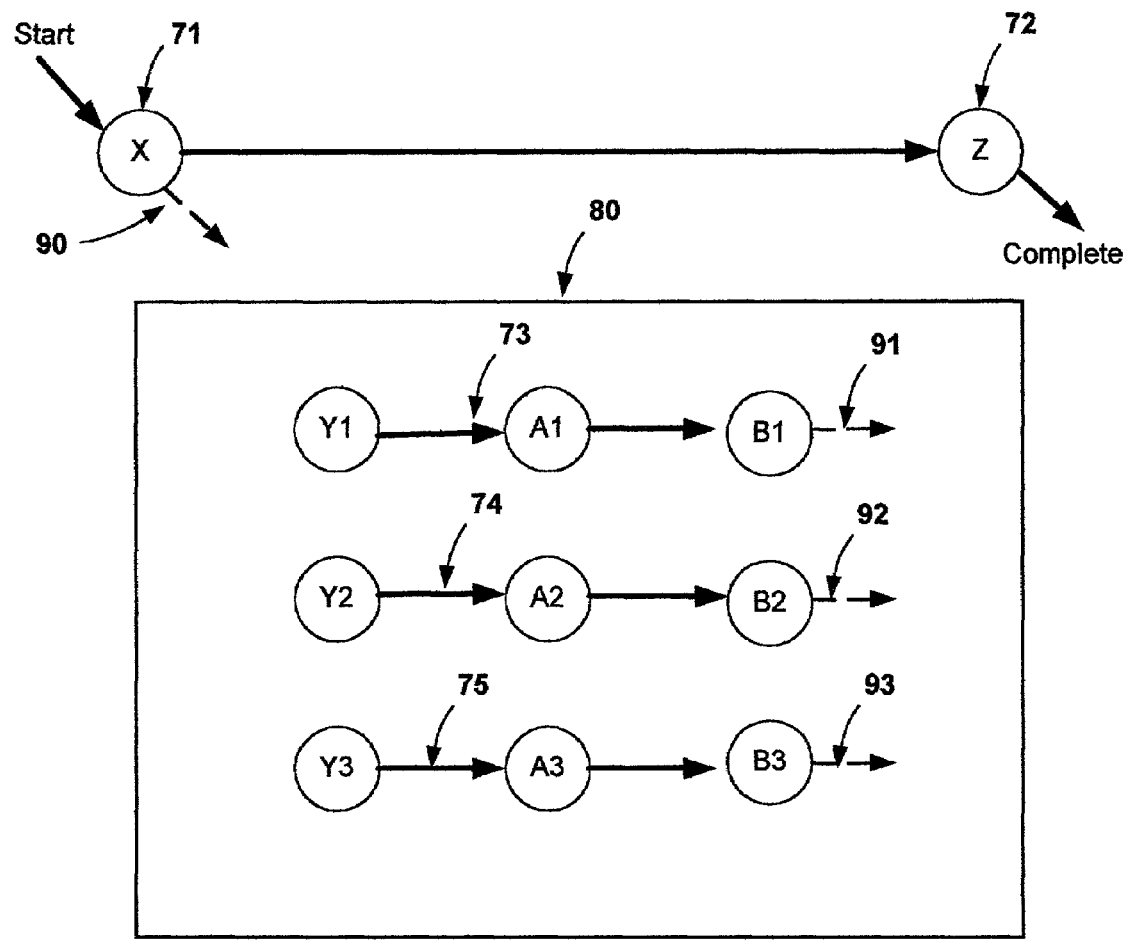
FIG. 10 illustrates the composite route generation using call and return links to sub-routes in a library.
Figure 10:
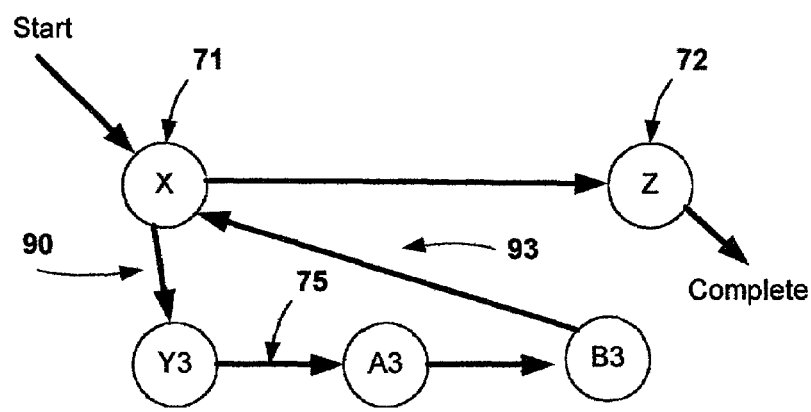
Figure 11:
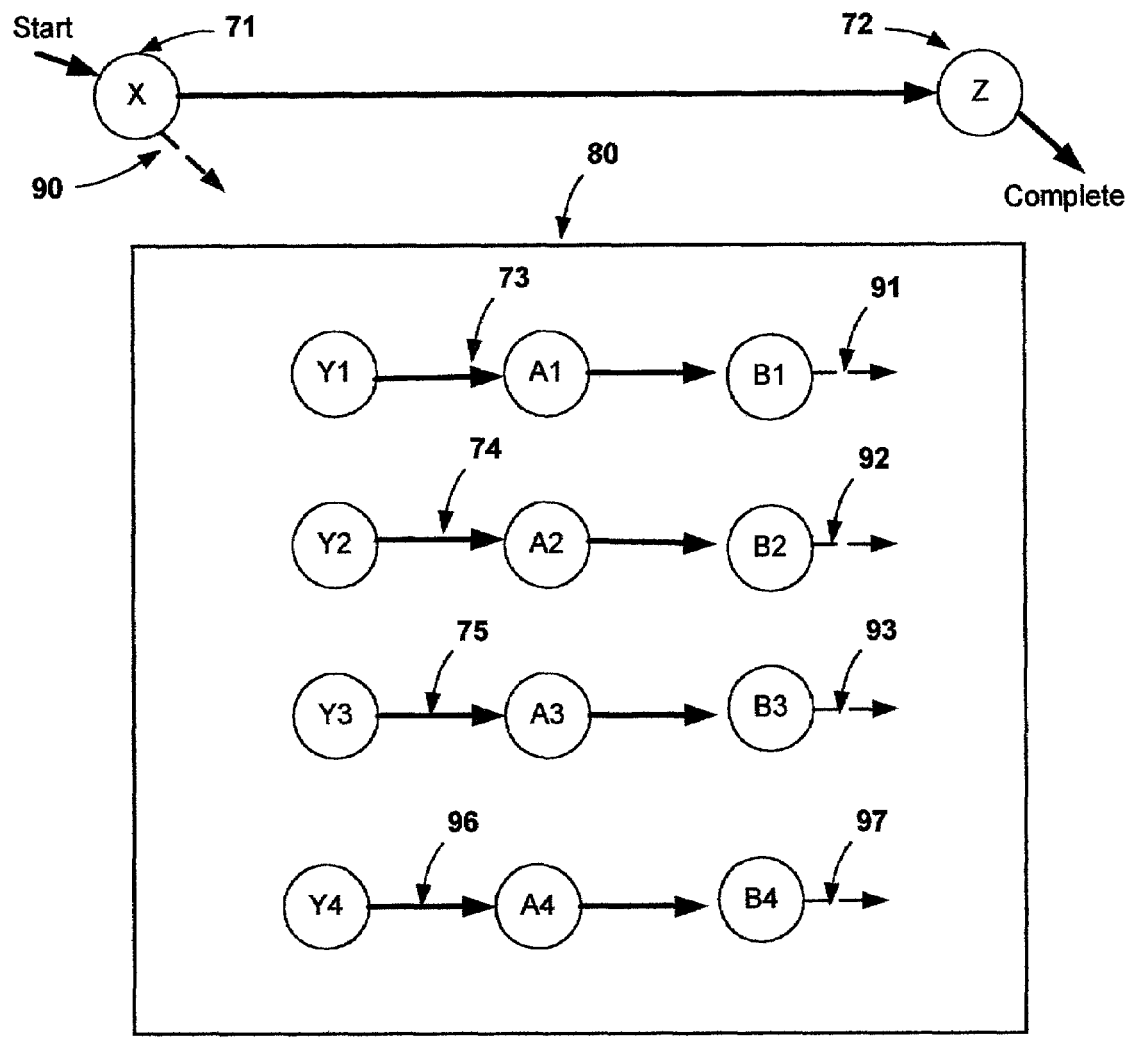
FIG. 11 illustrates the composite route generation where a new sub-route is added to the library of sub-routes.
Figure 11:
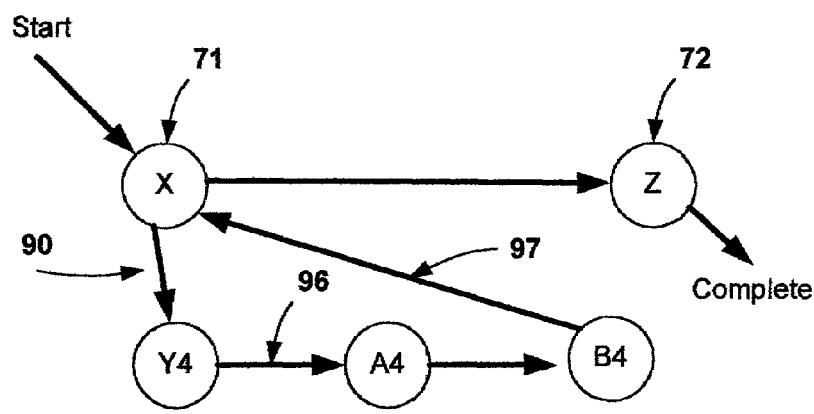

FIG. 10 illustrates another preferred embodiment of the use of the sub-route library where the composite route consists of node 71 linked to node 72. Node 71 has a sub-route calling link 90 that can link to a sub-route, execute the sub-route, and return to the calling node. The sub-routes in the library 80 are adapted so that the return link is created when called. For sub-route 75, after execution of the sub-route, link 93 will return control to the calling link. When the composite route 70 begins execution, node 71 is given control. Node 71 is assigned to User X, has a screen to view the business process information and to select a sub-route. Using the screen, User X selects a sub-route from the library 80 to perform the business process. In the example, User X selected sub-route 75. Sub-route 75 is copied for execution. The composite route linkage modifies link 90 from node 71 to call the copy of sub-route 75 and the return link 93 is set to return to node 71 at the completion of sub-route 75. Control is then passed to sub-route 75. At the completion of sub-route 75, control is passed back to node 71 using the return link 93. Node 71 then passes control to node 72 to compete the composite route 70. Those skilled in the art of subroutine linkage systems and libraries understand that if the sub-routes are designed to be re-entrant and the linkages and user assignments kept in separate structures that the sub-routs need not be copied. Note that is parallels the subroutine call and return interface used in many programming languages. The composite route linkage process can create the composite route in real time using the sub-route selection screen or may be used in an off-line process with a modified sub-route selection screen to crate the composite route a priori.

Unlike programs that run at nanosecond clock rates, the workflow runs at human speed. The selection of a sub-route is a human interface so that the workflow can adapt to the specifics of the information in the business process. For example, suppose that during the execution of the composite route 70, User X at node 71 could not find an appropriate sub-route for the business information in library 80. A new sub-route route 96 may be created, added to the library 80, and then called by the node 71 selection screen. Creating sub-route 96 may take many minutes but this level of delay may be tolerable since the business process runs at human speed. Plus, sub-route 96 is now in the library and can be reused if the business process information needs the functions provided by sub-route 96.

I claim:

1. A method for adapting in real-time a composite route from predefined workflow sub-routes while the composite route is executing in a workflow engine, comprising the steps of: using a route development and editor tool to:
   define a composite route comprising a sequence of nodes including an initial node, an adaptive node, an adapted sub-process between a first node and a second node, and a final node;
   wherein the adaptive node is positioned in the route to be executed before the adapted sub-process assigned to a key user, and provides a sub-route selection function to implement the adapted sub-process;

define and store the set of predefined workflow sub-routes in a sub-route library prior to execution of the composite route wherein each sub-route comprises a sequence of nodes to perform the adapted sub-process executing the composite route in the workflow engine starting at the initial node;

executing the adaptive node in the composite route, wherein the key user selects a sub-route to implement the adapted sub-process from the sub-route library using the sub-route selection function; and adapting the composite route in response to the key user's selection, during execution of the composite route, wherein the workflow engine adapts the composite route by inserting a copy of the selected sub-route into the composite route between the first node and second node;

executing the adapted composite route until the composite route's final node is performed.

2. The method of claim 1, wherein the adaptive node provides a multiple sub-route selection function such that the selected multiple sub-routes are inserted in the composite route and executed in parallel.

3. The method of claim 1, wherein the adaptive node provides a multiple sub-route selection function such that the selected multiple sub-routes are inserted in the composite route and executed in parallel and the final node provides a join function, including an "and join", an "or join", a "majority join", a "weighted join"; wherein the composite route completes when: all sub-routes complete for an "and join"; a first sub-route completes for an "or join"; a majority of sub-routes complete for a "majority join"; and for a "weighted join", each of the selected sub-routes are assigned a weight, a positive or negative number, such that the composite route completes when the sum of the weights of completed sub-routes exceeds a predetermined value.

4. The method of claim 1, wherein a set of local users are defined and the adaptive node provides a user selection function from the set of local users to specify a user for a node in the selected sub-route.

5. The method of claim 1, wherein a set of local users are defined by selecting users from a set of users using a selection criteria, including the composite route, site, user role, the selected sub-route and sub-route node, user organization level; and the adaptive node provides a user selection function from the set of local users to specify a user for a node in the selected sub-route.

6. The method of claim 1, wherein the set of sub-routes is selected from the sub-route library using a selection criteria, including the composite route, adapted process, site, sub-route function, and user organization level.

7. The method of claim 1, wherein the selected sub-route includes an adaptive node.

8. The method of claim 1, wherein the adaptive node provides a sub-route modification function such that the selected sub-route is modified and stored in the sub-route library.

9. The method of claim 1, wherein the adaptive node provides a sub-route assignment to an external event, including a button on a screen, for a node in the selected sub-route such that when the external event is activated, including a user pushing the button, the assigned sub-route is inserted in the compound route.

10. A method for adapting in real-time a composite workflow route from predefined workflow sub-routes while the composite route is executing in a workflow engine, comprising the steps of:

using a route development and editor tool to:

define a composite route comprising a sequence of nodes including an initial node, an adaptive node, an adapted sub-process between a first node and a second node, and a final node;

wherein the adaptive node is positioned in the route to be executed before the adapted sub-process, assigned to a key user, and provides a sub-route selection function and user selection function to implement the adapted sub-process;

define and store the set of predefined workflow sub-routes in a sub-route library prior to execution of the composite route wherein each sub-route comprises a sequence of nodes to perform the adapted sub-process;

define and store a set of local users prior to execution of the composite route wherein each local user can be assigned a node in a selected sub-route to implement an adapted sub-process;

executing the composite route in the workflow engine starting at the initial node;

executing the adaptive node in the composite route, wherein the key user selects a sub-route to implement the adapted sub-process from the sub-route library using the sub-route selection function and a local user for a node in the selected sub-route using the user selection; and adapting the composite route in response to the key user's selections, during execution of the composite route, wherein the workflow engine adapts the composite route by inserting a copy of the selected sub-route into the composite route between the first node and second node, and assigning the selected user to the node in the selected sub-route;

executing the adapted composite route until the composite route's final node is performed.

11. The method of claim 10, wherein the adaptive node provides a multiple sub-route selection function such that the selected multiple sub-routes are inserted in the composite route and executed in parallel and the final node provides a join function, including an "and join", an "or join", a "majority join", a "weighted join"; wherein the composite route completes when: all sub-routes complete for an "and join"; a first sub-route completes for an "or join"; a majority of sub-routes complete for a "majority join"; and for a "weighted join", each of the selected sub-routes are assigned a weight, a positive or negative number, such that the composite route completes when the sum of the weights of completed sub-routes exceeds a predetermined value.

12. The method of claim 10, wherein a set of local users are defined by selecting from a set of users using a selection criteria, including the composite route, site, user role, the selected sub-route and sub-route node, user organization level; and the adaptive node provides a user selection function from the set of local users to specify a user for a node in the selected sub-route.

13. The method of claim 10, wherein the set of sub-routes is selected from the sub-route library using a selection criteria, including the composite route, customer request, site, sub-route function, and user organization level.

14. The method of claim 10, wherein the selected sub-route includes an adaptive node.

15. The method of claim 10, wherein the adaptive node provides a sub-route modification function such that the selected sub-route is modified and stored in the sub-route library.

16. A method for adapting in real-time a composite route from predefined workflow sub-routes while the composite route is executing in a workflow engine, comprising the steps of:

using a route development and editor tool to:

define a composite route comprising a sequence of nodes including an initial node, a first adaptive node, a first adapted sub-process between a first node and a second node, and a final node;

wherein the first adaptive node is positioned in the route to be executed before the first adapted sub-process, assigned to a key user, and provides a sub-route selection function to implement the first adapted sub-process;

define and store the set of predefined workflow sub-routes in a sub-route library prior to execution of the composite workflow wherein at least one sub-route comprises a second adaptive node that provides a sub-route selection function and a user selection function and a second adapted sub-process between a third node and fourth node;

define and store a set of local users prior to execution of the composite workflow wherein each local user can be assigned a node in a selected sub-route to perform implement a sub-process;

executing the composite route in the workflow engine beginning with the composite route's initial node;

executing, the first adaptive node in the composite route, wherein the key user selects a first sub-route from the sub-route library using the sub-route selection function to implement the first adapted process;

adapting the composite route in response to the key user's selections, during execution of the composite route, wherein the workflow engine adapts the composite route by inserting a copy of the selected first sub-route into the composite route between the first and second nodes;

executing the selected first sub-route where the user of the second adaptive node selects a second sub-route from the sub-route library using the sub-route selection function and a user for a node in the selected second sub-route using the user selection function to implement the second adapted sub-process; and adapting the first sub-route in response to the user's selections, during execution of the first sub-route, wherein the workflow engine adapts the first sub-route by inserting a copy of the selected second sub-route into the first sub-route between the third node and fourth nodes, and assigning the selected user to the node in the selected second sub-route;

executing the composite route until the composite route's final node is performed.

17. The method of claim 16, wherein the adaptive node provides a multiple sub-route selection function such that the selected multiple sub-routes are inserted in the composite route and executed in parallel and the final node provides a join function, including an "and join", an "or join", a "majority join", a "weighted join"; wherein the composite route completes when: all sub-routes complete for an "and join"; a first sub-route completes for an "or join"; a majority of sub-routes complete for a "majority join"; and for a "weighted join", each of the selected sub-routes are assigned a weight, a positive or negative number, such that the composite route completes when the sum of the weights of completed sub-routes exceeds a predetermined value.

18. The method of claim 16, wherein a set of local users are defined by selecting from a set of users using a selection criteria including the composite route, site, user role, the selected sub-route and sub-route node, user organization level; and the adaptive node provides a user selection function from the set of local users to specify a user for a node in the selected sub-route.

19. The method of claim 16, wherein the set of sub-routes is selected from the sub-route library using a selection criteria, including the composite route, customer request, site, sub-route function, and user organization level.

20. The method of claim 16, wherein the adaptive node provides a sub-route modification function such that the selected sub-route is modified and stored in the sub-route library.

* * * * *